Figure 1:
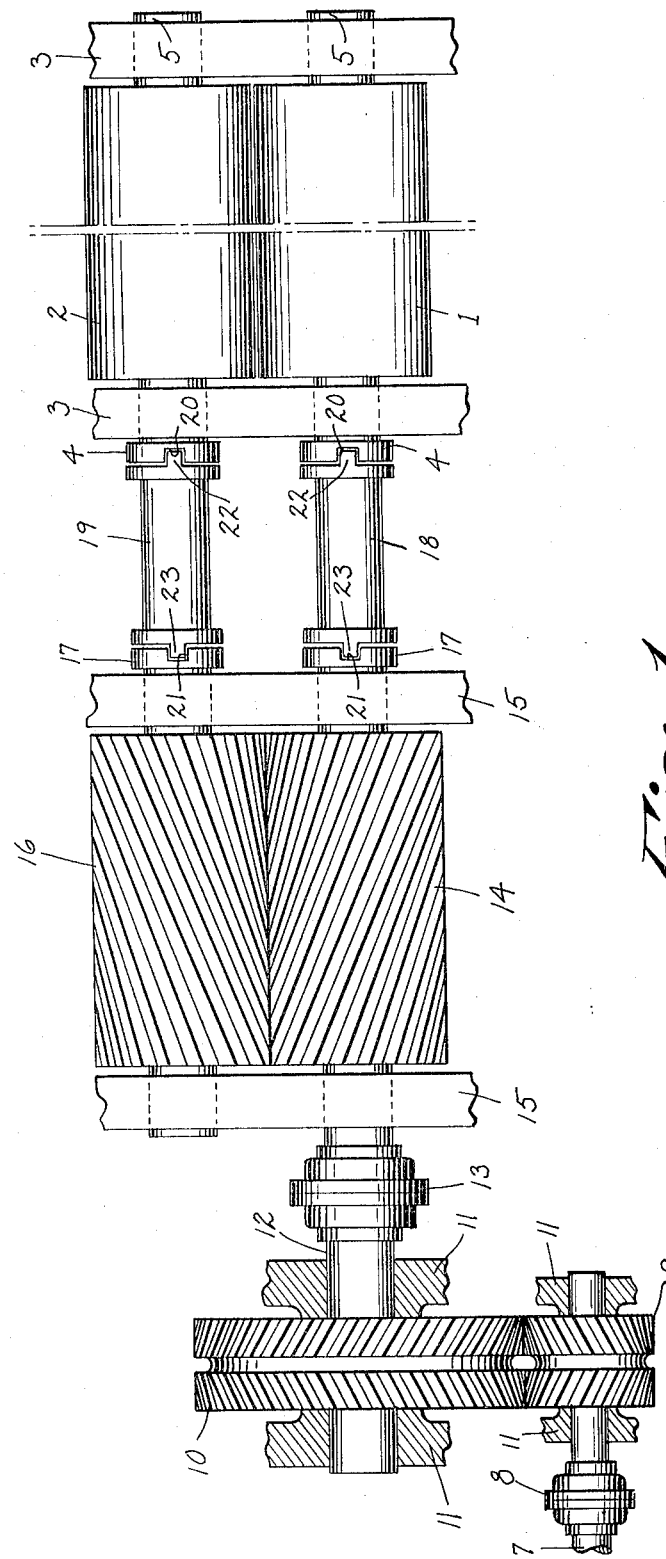

Dec. 27, 1966   R. J. THOMAS ETAL   3,293,898
AUXILIARY DRIVE SYSTEM FOR STEEL ROLLING MILLS
Filed March 16, 1964   2 Sheets-Sheet 1

INVENTORS
RICHARD J. THOMAS
RONALD A. WITT

BY *Donald J. Casser*

ATTORNEY

INVENTORS
RICHARD J. THOMAS
RONALD A. WITT

BY *Donald J. Casser*

ATTORNEY

United States Patent Office 3,293,898
Patented Dec. 27, 1966

3,293,898
AUXILIARY DRIVE SYSTEM FOR
STEEL ROLLING MILLS
Richard J. Thomas, Fox Point, and Ronald A. Witt,
Brown Deer, Wis., assignors to The Falk Corporation,
Milwaukee, Wis., a corporation of Wisconsin
Filed Mar. 16, 1964, Ser. No. 352,044
9 Claims. (Cl. 72—249)

This invention relates to an auxiliary drive system for steel rolling mills of the type that is intended to operate the rolling mill when the main drive motor is off so as to facilitate change of the work rolls in the rolling mill, particularly to aid in the alignment problems associated with work roll change.

A typical steel rolling mill includes a main drive motor that drives, through speed reduction gears, two or more pinions arranged on a pinion stand, which pinions are in turn connected to the work rolls of the rolling mill by means of suitable coupling members. Periodically, it becomes necessary to change the work rolls in the rolling mill. In order to accomplish this, it is necessary to incorporate some type of auxiliary drive system that will drive the main drive system at a very slow rate of speed, on the order of 1 r.p.m., to enable the pinions, coupling members and work rolls to be aligned in a position to permit quick removal of the existing work rolls and also quick connection of the couplings after new work rolls have been inserted and it is desired to drivingly connect them to the pinions.

Several general types of auxiliary drive systems are in common use with steel rolling mills, but each of them possesses certain undesirable characteristics. One typical system includes an auxiliary motor driving the main motor through an over-running clutch located between the auxiliary speed reduction gearing and the main motor. In the operation of this system the over-running clutch does not transmit power when the main motor is operating, but when the main motor is off the auxiliary motor connected to the over-running clutch is engaged so as to drive the work rolls through the auxiliary speed reduction gearing, main motor and pinions. However, in this type of auxiliary drive system, problems have been presented by reason of the clutches burning out because of poor alignment and because of the high over-running speeds used in comparison with the size of clutch required. A second form of auxiliary drive system uses shiftable splines connected between the auxiliary speed reduction gearing and the main motor; in operation of this system, after the main motor is turned off, the splines are shifted to make the connection between the auxiliary speed reduction gearing and the main motor, the auxiliary motor is then turned on and drives the rolling mill through the main motor system. This type of auxiliary drive system is objectionable because it cannot be remotely operated to enable easy movement of the splines between their driving and non-driving positions. Another system utilizes a pinion mounted on a pivoted arm that is used to connect the auxiliary drive system to the main motor; this type of system becomes quite expensive and complicated for proper operation.

The main object of this invention is to provide an auxiliary drive system for a steel rolling mill that will overcome the defects of the aforementioned generally-used types of auxiliary drive systems. A more specific object is to provide an auxiliary drive system for rolling mills that will eliminate the use of over-running clutches, shiftable splines or pivoted movable pinions. Another object of this invention is to provide an auxiliary drive system for rolling mills that can be remotely controlled to be turned on and off at selected times. Yet another object of this invention is to provide an auxiliary drive system for a steel rolling mill that includes an auxiliary drive motor and other functional elements that enable the auxiliary drive system to cease the transmission of power when the main motor is on; a related object is to provide a system of the foregoing type which will cease the transmission of power when the auxiliary motor is off.

Briefly stated, the present invention accomplishes its objects through the provision of an auxiliary drive system incorporating an auxiliary drive motor that is arranged to drive the main motor in a steel rolling mill through speed reduction gearing and a hydraulic clutch. A hydraulic system is also included that is driven by the auxiliary drive motor and which is adapted to complete the driving engagement through the hydraulic clutch when the auxiliary drive motor is on and that may also be adapted to disrupt the driving engagement connection through the hydraulic clutch when the main motor is on.

The above-mentioned and other more specific objects will appear in the description which follows. In the description, reference is made to the accompanying drawings which form a part hereof and in which there is shown, by way of illustration, a specific form in which this invention may be practiced. This embodiment will be described in detail to enable those skilled in the art to practice this invention, but it is to be understood that other embodiments of the invention may be used and that structural changes in the embodiment described herein may be made by those skilled in the art without departing from the true scope of the present invention. The scope of this invention is best defined by the appended claims and limitations set out in the following detailed description need not be taken in a limiting sense except insofar as they may be incorporated in the claims.

Figure 1A:
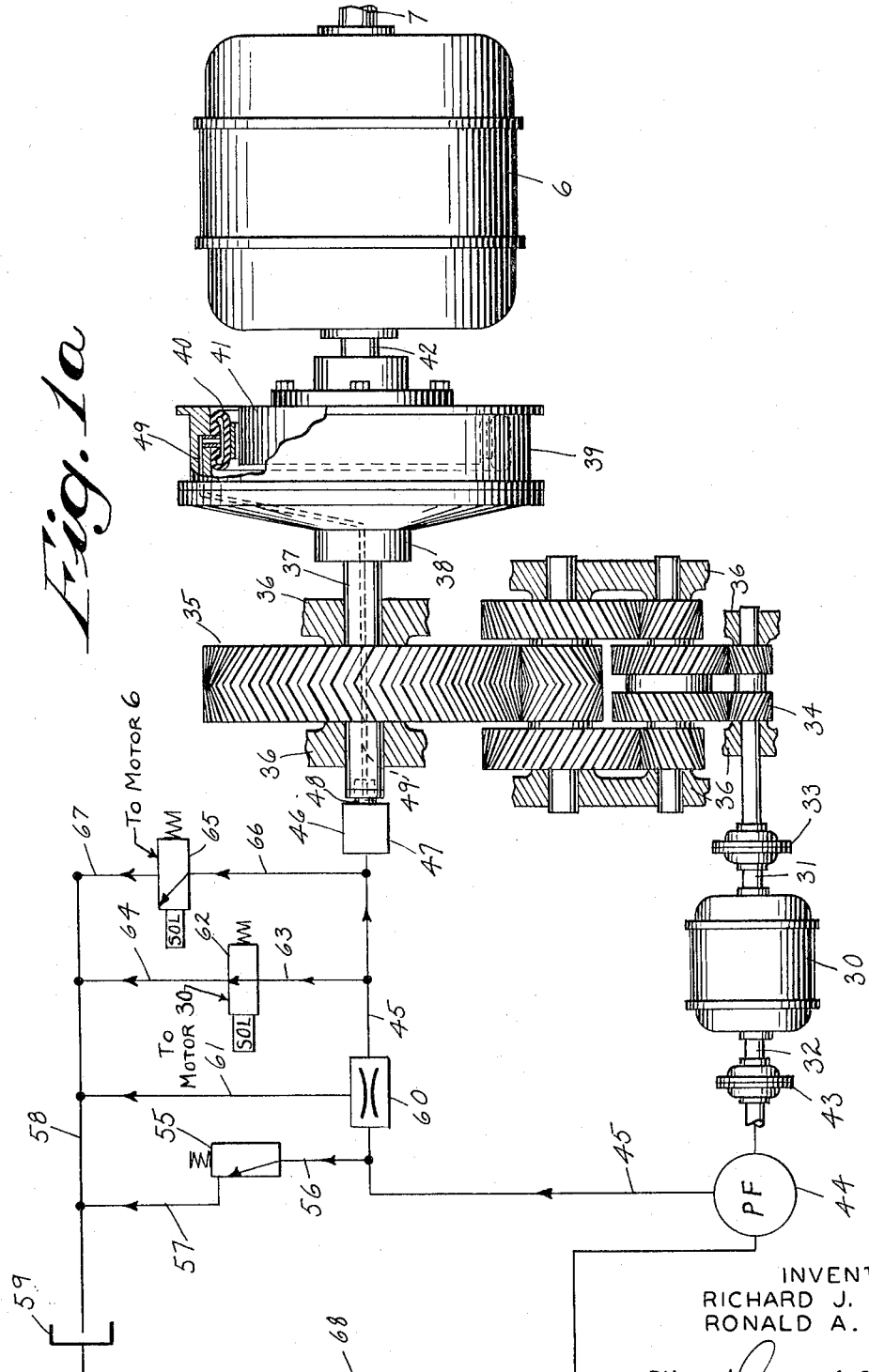

In the drawings:

FIG. 1 represents a portion of a conventional two-high steel rolling mill including main speed reduction gearing, drive pinions, couplings and the work rolls; and FIG. 1a illustrates the main drive motor for the rolling mill illustrated in FIG. 1 together with the auxiliary drive system of this invention operatively connected therewith.

*Main drive system description*

FIG. 1 depicts a conventional two-high rolling mill including work rolls 1 and 2 journalled in a housing 3. Each work roll includes a neck portion 4 at one end and a neck portion 5 at the other end; each neck portion is journalled in suitable chocks or bearings, not shown, disposed in the housing 3. Additionally, one or more adjusting screws not shown would be included in the housing in order to regulate the distance between the work rolls.

The work rolls are driven by a main motor 6, see FIG. 1a, herein shown as an electric motor, whose output shaft 7 is connected by a shaft coupling 8 to the high speed pinion 9 of a main drive speed reducer, generally indicated by the numeral 10, that includes a housing 11 for supporting its several shafts, bearings, etc. The low speed shaft 12 of the speed reducer 10 is connected through shaft coupling 13 to pinion 14 journalled in a pinion stand 15. The pinion 14 meshes with another pinion 16 also journalled in the pinion stand. Each pinion 14 and 16 includes a neck portion 17 that extends through one of the side portions of the pinion stand.

The driving connection between the pinions 14 and 16 and the work rolls 1 and 2 is furnished by means of a spindle 18 drivingly connecting pinion 14 with work roll 1 and a spindle 19 drivingly connecting pinion 16 with work roll 2, spindles 18 and 19 being of similar construction. The necks 4 of the work rolls 1 and 2 include a wobbler 20 formed by notching the outer extremity of each neck. The necks 17 of the pinions 14 and 16 include a wobbler 21 similar to that on the necks of the two work rolls. The spindles 18 and 19 include a wobbler 22 at their ends nearest the work rolls and a similar wobbler 23 at their opposite ends nearest the pinions. The wobblers 22 and 23 on the spindles are formed as projecting tongue-like members, with the wobblers 22 designed to engage the wobblers 20 formed in the neck portions 4 of the work rolls and the wobblers 23 designed to be engaged in the wobblers 21 formed in the neck portion 17 of the pinions. In this manner the driving connection between the pinions and the work rolls is established. Although not shown, suitable coupling boxes would also be installed about the spindles and the projecting neck portions of the pinions and the rolls in order to establish the driving connection.

The apparatus described to this point is a conventional two-high rolling mill and forms no part of the present invention. It has been schematically diagrammed in order to illustrate the field of use for the present invention which is to be operatively associated with the rolling mill. From the foregoing description, it is apparent that operation of the main motor 6 causes the work rolls to be driven through the main speed reducer 10 and pinions 14 and 16. From time to time during operation of the rolling mill of the type described above, it is necessary to change the work rolls. To accomplish this, the main work roll driving system must be slowly turned by means of an auxiliary drive system in order to align the pinion, spindle and work roll wobblers so that the suitable linkage can be first disrupted and then reestablished after new work rolls have been installed. The present invention relates to an auxiliary drive system adapted to slowly turn a main drive system of the foregoing type to perform the necessary alignment during change of the work rolls. Although the present invention is shown here as used with a two-high rolling mill, it is not limited thereto and can also be used with other types of rolling mills, including the three-high and four-high mills.

*Auxiliary drive system description*

The auxiliary drive system of the present invention is illustrated in FIG. 1a and includes an auxiliary drive motor 30 having output shafts 31 and 32. The output shaft 31 of the auxiliary drive motor is connected through a shaft coupling 33 to the high speed pinion 34 of the auxiliary speed reduction gearing indicated generally by the numeral 35 and shown herein as a triple reduction speed reducer. The speed reducer 35 includes a housing 36, portions of which are indicated in FIG. 1a, in which the various shafts, bearings and other structure are contained. The speed reducer 35 includes a series of intermeshing pinions and gears arranged in driving engagement to drive a low speed output shaft 37 at the desired output speed. One end of the low speed output shaft 37 is connected to the outer rotating member 38 of a hydraulically actuated clutch 39 of conventional construction. The outer member 38 of the clutch carries a flexible expandable annular gland 40 attached to its inner peripheral surface. A concentric rotor member 41 is attached to shaft 42 of the main motor 6. The operation of the clutch 39 is such that when the gland 40 becomes expanded by being filled with hydraulic fluid under pressure, the gland will frictionally grip the rotor to form the driving connection between the outer member 38 and the inner rotor 41 of the clutch.

The hydraulic circuit of the present invention basically includes a hydraulic pump 44, a high pressure fluid supply line 45, a sump 59, and a suction line 68, which are arranged to actuate the gland 40 of the hydraulic clutch. A number of other hydraulic elements are included in the hydraulic circuit to provide important operational advantages to the basic circuit. The various components of the circuit and their operation will now be described in detail. The second output shaft 32 of the auxiliary drive motor 30 is connected through a shaft coupling 43 to a hydraulic pump 44. A high pressure fluid supply line 45 leads from the hydraulic pump 44 to a rotary seal 46 of conventional construction that enables hydraulic fluid to be supplied to the gland 40 while the shaft 37 is rotating. Briefly, the rotary seal 46 includes a stationary member 47 attached to a convenient housing not shown and a rotating member 48 attached to a hydraulic line 49 (shown in dotted lines in FIG. 1a) that extends axially through the shaft 37, which is made hollow for this purpose, and then through the outer member 38 of the hydraulic clutch to communicate with the expandable gland 40. Suitable ports and chambers in the rotary seal direct fluid into and out of the hydraulic line during rotation of the shaft 37.

A relief valve 55 and metering disc 60 are combined with the high pressure fluid supply line 45 so as to limit the amount of hydraulic pressure applied to the annular gland 40 of the clutch. The relief valve 55 is connected to the high pressure fluid supply line 45 through line 56 and is connected to line 58 through line 57 so that when pressure in line 45 exceeds the design limit, fluid will be diverted through lines 56, valve 55 and line 57 to the line 58 and thence to a sump or reservoir 59. The metering disc 60 directs excess hydraulic fluid through line 61 to the line 58 and thence to the sump 59 in performing its function in the hydraulic circuit. The relief valve 55 and metering disc 60 with their connecting fluid lines thus serve as means for limiting the fluid pressure in the high pressure fluid supply line 45 in the illustrated embodiment.

The hydraulic circuit includes provision for decreasing the fluid pressure in the high pressure fluid supply line 45 to zero when the auxiliary drive motor 30 is turned off. In the form illustrated herein, this comprises a solenoid valve 62 connected to supply line 45 through line 63 and connected to line 58 through line 64. The solenoid valve 62 is normally open, that is, when receiving no electrical energy, and is electrically connected to the auxiliary drive motor 30 (as indicated by the legend in FIG. 1a) so that the solenoid valve will close when the auxiliary motor is running and thereby maintain fluid pressure in the supply line 45 leading to the gland 40 of the hydraulic clutch. However, when the auxiliary drive motor 30 is not running, the solenoid valve 62 opens so that fluid will be diverted through the valve and into the reservoir 59 by way of line 58. When the solenoid valve opens in this fashion, the fluid pressure in supply line 45 is reduced to zero and the gland 40 on the hydraulic clutch 39 will deflate and disengage from the rotor 41 so that no power will be transmitted through the clutch to the main motor 6. In this fashion, the solenoid valve 62 and its appendant fluid lines serve as means for diverting fluid from the high pressure fluid supply to the reservoir when the auxiliary drive motor is off, thereby preventing expansion of the gland 40 and providing a fail-safe feature in that the auxiliary hydraulic drive system will not be actuated to drive the main motor when the auxiliary motor is off.

The hydraulic circuit also includes provision to decrease the pressure in the high pressure fluid supply line 45 when the main motor 6 is operating. In the illustrated form, this includes a solenoid valve 65 communicating with the high pressure fluid supply line 45 through line 66 and communicating with the line 58 through line 67. The solenoid valve 65 is normally closed (i.e. when receiving no electrical energy) and is electrically connected to the main motor 6 (as indicated by the legend in FIG. 1a) so that when the main motor 6 is turned on, the solenoid valve 65 will open. When the solenoid valve 65 opens, high pressure fluid flows through line 66, the valve 65, and thence to the reservoir 59 so as to divert the hydraulic fluid to the sump when the main motor is on and thereby prevent high pressure fluid from being supplied to the gland 40. In this manner the gland 40 will deflate and disengage from the rotor 41 of the clutch 39 so that no power will be transmitted to the main motor from the auxiliary drive system when the main motor is operating. This system thus provides a second fail-safe feature in the auxiliary drive of this invention.

The various valves and other hydraulic components shown in FIG. 1a have been illustrated by means of standard drawing symbols promulgated by The American Society of Mechanical Engineers in their American Standard Geographical Symbols for Fluid Power Diagrams, ASA Y32, December 1956.

*Operation*

During normal operation of the rolling mill illustrated herein, the main motor 6 drives the work rolls 1 and 2 through the illustrated main drive system and the auxiliary drive motor 30 will be off. In this condition, the solenoid valve 65 actuated by the main motor 6 will be open, and the solenoid valve 62 actuated by the auxiliary motor will be open so that no fluid pressure will be supplied to the gland 40 of the hydraulic clutch and the entire auxiliary drive system will thereby be disengaged from the main motor 6. However, when it is desired to change the work rolls, the main motor 6 will be turned off and the auxiliary drive motor 30 turned on, in which condition the solenoid valve 62 actuated by the auxiliary drive motor 30 will close and the solenoid valve 65 actuated by the main motor 6 will close (since the main motor is off) so that the hydraulic pump will supply high pressure fluid through the line 49 and then to the gland 40 of the hydraulic clutch 39 to expand the gland and form the driving connection with the main drive system. Power will then be transmitted through the speed reducer 35 to drive the main motor 6 and the work rolls 1 and 2 at a selected slow rate of speed. When driven at this slow speed, the spindles and the associated wobbler couplings can be stopped at any desired position of alignment to enable the spindles to be disengaged from the necks of the work rolls 1 and 2 so that the driving connection with the work rolls can be disengaged and the worn work rolls replaced with new ones. During this change of work rolls, the auxiliary drive system can again be actuated so as to revolve the driving pinions to a desired position that will facilitate insertion of new work rolls and completion of the driving connection between the pinions, spindles and work rolls. The auxiliary drive system can then be turned off and the rolling mill driven through the main drive system for normal operation.

There has thus been provided an improved auxiliary drive system for a rolling mill that eliminates the use of an over-running clutch, shiftable splines or pivoted pinion such as are used in typical prior art systems to make the driving connection between the auxiliary drive system and the main drive system. The auxiliary drive system of this invention is much more susceptible to remote control than are the prior art systems. The hydraulic circuit incorporated in the auxiliary drive system of the present invention includes provision to disengage the driving connection with the main motor of the rolling mill in event the main motor should be actuated while the auxiliary drive motor is operating and also includes provision to quickly disengage the driving connection with the rolling mill when the auxiliary drive motor is turned off. For these and other reasons, the auxiliary drive system of this invention, utilizing a hydraulic clutch and an associated hydraulic circuit, provides important operational features not presently attainable with any other individual auxiliary drive system for rolling mills.

It is to be understood that it is intended to cover all changes and modifications of the form of this invention herein chosen for the purposes of illustration which do not constitute a departure from the spirit and scope of this invention.

We claim:
1. In a rolling mill of the type including (a) work rolls, (b) a main drive system for normally operating the work rolls comprising a main motor, pinions driven by the main motor, and couplings connecting the pinions to the work rolls, and (c) an auxiliary drive system for operating the rolling mill when the main motor is off to slowly turn the pinions and align the couplings in a suitable position to facilitate change of the work rolls, an improved auxiliary drive system comprising, in combination:
   (1) an auxiliary drive motor;
   (2) a hydraulic clutch including a first rotatable member, a second rotatable member connected to the main motor, and an expandable gland attached to one of said members and adapted to expand when filled with fluid to form a driving connection between the first and second members;
   (3) speed reduction gearing connecting the auxiliary drive motor to the first rotatable member of the clutch;
   (4) a hydraulic pump driven by the auxiliary drive motor;
   (5) a high pressure fluid supply line leading from the pump to the expandable gland of the clutch so that fluid can be supplied to expand the gland to form the aforesaid driving connection;
   (6) a fluid reservoir; and
   (7) a fluid return line for supplying fluid to the hydraulic pump from the reservoir.

2. In a rolling mill of the type including (a) work rolls, (b) a main drive system for normally operating the work rolls comprising a main motor, pinions driven by the main motor, and couplings connecting the pinions to the work rolls, and (c) an auxiliary drive system for operating the rolling mill when the main motor is off to slowly turn the pinions and align the couplings in a suitable position to facilitate change of the work rolls, an improved auxiliary drive system comprising, in combination:
   (1) an auxiliary drive motor;
   (2) a hydraulic clutch including a first rotatable member, a second rotatable member connected to the main motor, and an expandable gland attached to one of said members and adapted to expand when filled with fluid to form a driving connection between the first and second members;
   (3) speed reduction gearing connecting the auxiliary drive motor to the first rotatable member of the clutch;
   (4) a hydraulic pump driven by the auxiliary drive motor;
   (5) a high pressure fluid supply line leading from the pump to the expandable gland of the clutch so that fluid can be supplied to expand the gland to form the aforesaid driving connection;
   (6) a fluid reservoir;
   (7) a fluid return line for supplying fluid to the hydraulic pump from the reservoir; and
   (8) means for diverting fluid from the high pressure fluid supply line to the reservoir when the main motor is operating to thereby prevent expansion of the gland of the hydraulic clutch.

3. Apparatus as defined in claim 2 wherein the last said means (8) includes a solenoid valve, a first fluid flow line connecting the valve to the high pressure fluid supply line, and a second fluid flow line connecting the valve to the reservoir, said solenoid valve being closed to the passage of fluid therethrough when the main motor is off and open to the passage of fluid therethrough when the main motor is on.

4. In a rolling mill of the type including (a) work rolls, (b) a main drive system for normally operating the work rolls comprising a main motor, pinions driven by the main motor, and couplings connecting the pinions to the work rolls, and (c) an auxiliary drive system for operating the rolling mill when the main motor is off to slowly turn the pinions and align the couplings in a suitable position to facilitate change of the work rolls, an improved auxiliary drive system comprising, in combination:
  (1) an auxiliary drive motor;
  (2) a hydraulic clutch including a first rotatable member, a second rotatable member connected to the main motor, and an expandable gland attached to one of said members and adapted to expand when filled with fluid to form a driving connection between the first and second members;
  (3) speed reduction gearing cannecting the auxiliary drive motor to the first rotatable member of the clutch;
  (4) a hydraulic pump driven by the auxiliary drive motor;
  (5) a high pressure fluid supply line leading from the pump to the expandable gland of the clutch so that fluid can be supplied to expand the gland to form the aforesaid driving connection;
  (6) a fluid reservoir;
  (7) a fluid return line for supplying fluid to the hydraulic pump from the reservoir; and
  (8) means for diverting fluid from the high pressure fluid supply line to the reservoir when the auxiliary drive motor is off to prevent expansion of the gland of the hydraulic clutch.

5. An auxiliary drive as defined in claim 4 wherein the last said means (8) includes a solenoid valve, a first fluid flow line connecting the solenoid valve to the high pressure fluid supply line, and a second fluid flow line connecting the solenoid valve to the reservoir, said solenoid valve being closed to the passage of fluid therethrough when the auxiliary motor is on and open to the passage of fluid when the auxiliary motor is off.

6. In a rolling mill of the type including (a) work rolls, (b) a main drive system for normally operating the work rolls comprising a main motor, pinions driven by the main motor, and couplings connecting the pinions to the work rolls, and (c) an auxiliary drive system for operating the rolling mill when the main motor is off to slowly turn the pinions and align the couplings in a suitable position to facilitate change of the work rolls, an improved auxiliary drive system comprising, in combination:
  (1) an auxiliary drive motor;
  (2) a hydraulic clutch including a first rotatable member, a second rotatable member connected to the main motor, and an expandable gland attached to one of said members and adapted to expand when filled with fluid to form a driving connection between the first and second members;
  (3) speed reduction gearing connecting the auxiliary drive motor to the first rotatable member of the clutch;
  (4) a hydraulic pump driven by the auxiliary drive motor;
  (5) a high pressure fluid supply line leading from the pump to the expandable gland of the clutch so that fluid can be supplied to expand the gland to form the aforesaid driving connection;
  (6) a fluid reservoir;
  (7) a fluid return line for supplying fluid to the hydraulic pump from the reservoir;
  (8) means for diverting fluid from the high pressure fluid supply line to the reservoir when the main motor is operating to thereby prevent expansion of the gland of the hydraulic clutch; and
  (9) means for diverting fluid from the high pressure fluid supply line to the reservoir when the auxiliary drive motor is off to prevent expansion of the gland of the hydraulic clutch.

7. An auxiliary drive as defined in claim 6 wherein the means (8) for diverting fluid from the high pressure fluid supply line to the reservoir when the main motor is operating includes a solenoid valve, a first fluid flow line connecting the valve to the high pressure fluid supply line, and a second fluid flow line connecting the valve to the reservoir, said solenoid valve being closed to the passage of fluid therethrough when the main motor is off and open to the passage of fluid therethrough when the main motor is on.

8. An auxiliary drive as defined in claim 6 wherein the means (9) for diverting fluid from the high pressure fluid supply line to the reservoir when the auxiliary drive motor is off includes a solenoid valve, a first fluid flow line connecting the solenoid valve to the high pressure fluid supply line, and a second fluid flow line connecting the solenoid valve to the reservoir, said solenoid valve being closed to the passage of fluid therethrough when the auxiliary motor is on and open to the passage of fluid when the auxiliary motor is off.

9. An auxiliary drive as defined in claim 8 wherein the means (8) for diverting fluid from the high pressure fluid supply line to the reservoir when the main motor is operating includes a solenoid valve, a first fluid flow line connecting the valve to the high pressure fluid supply line, and a second fluid flow line connecting the valve to the reservoir, said solenoid valve being closed to the passage of fluid therethrough when the main motor is off and open to the passage of fluid therethrough when the main motor is on.

References Cited by the Examiner
UNITED STATES PATENTS

| | | | |
|---|---|---|---|
| 2,757,556 | 8/1956 | Uebing | 72—249 |
| 3,089,662 | 5/1963 | Addicks | 198—88 |

CHARLES W. LANHAM, *Primary Examiner.*

R. D. GREFE, *Assistant Examiner.*